US012071297B2

(12) United States Patent
Jehn et al.

(10) Patent No.: US 12,071,297 B2
(45) Date of Patent: Aug. 27, 2024

(54) CANISTER FOR PHARMACEUTICAL DISPENSING MACHINE AND DIVERTER KIT FOR SAME

(71) Applicant: PARATA SYSTEMS, LLC, Durham, NC (US)

(72) Inventors: Michael W. Jehn, Waukesha, WI (US); Brian Bishop, Wonder Lake, IL (US)

(73) Assignee: PARATA SYSTEMS, LLC, Durham, NC (US)

( * ) Notice: Subject to any disclaimer, the term of this patent is extended or adjusted under 35 U.S.C. 154(b) by 215 days.

(21) Appl. No.: 17/669,586

(22) Filed: Feb. 11, 2022

(65) Prior Publication Data

US 2022/0281672 A1 Sep. 8, 2022

Related U.S. Application Data

(60) Provisional application No. 63/155,814, filed on Mar. 3, 2021.

(51) Int. Cl.
*B65D 83/04* (2006.01)
*A61J 1/03* (2023.01)

(52) U.S. Cl.
CPC .............. *B65D 83/049* (2013.01); *A61J 1/03* (2013.01); *B65D 2585/56* (2013.01)

(58) Field of Classification Search
CPC .................................................... B65D 83/049
See application file for complete search history.

(56) References Cited

U.S. PATENT DOCUMENTS 6,898,919 B2 5/2005 Kim
7,228,988 B2 6/2007 Inamura
7,258,248 B2 8/2007 Kim
7,395,135 B2 * 7/2008 Kim ........................ G16H 20/13 221/9
7,395,946 B2 * 7/2008 Yuyama .................. B65B 35/08 221/265
7,637,078 B2 12/2009 Ishiwatari et al.
2007/0145066 A1 * 6/2007 Knoth ................. G07F 17/0092 221/265
2008/0029530 A1 * 2/2008 Yuyama .................... B65B 9/06 221/2
2013/0320033 A1 * 12/2013 Brug ........................ B65B 35/08 221/265
2023/0286687 A1 * 9/2023 Schmidt-Ellinger ........................ B65D 83/0409 221/203

* cited by examiner

*Primary Examiner* — Gene O Crawford
*Assistant Examiner* — Ayodeji T Ojofeitimi
(74) *Attorney, Agent, or Firm* — Myers Bigel, P.A.

(57) ABSTRACT

A canister for an automated pharmacy packaging machine includes: a base; a rotary member positioned in the base; a sleeve mounted to the base having a cavity; a diverter mounted to the sleeve and extending into the cavity, the diverter having a leading edge; and a cover mounted to the sleeve. The diverter is oriented at an oblique angle relative to a longitudinal axis of the sleeve.

17 Claims, 12 Drawing Sheets

CANISTER FOR PHARMACEUTICAL DISPENSING MACHINE AND DIVERTER KIT FOR SAME

RELATED APPLICATION

This application claims priority from and the benefit of U.S. Provisional Patent Application No. 63/155,814, filed Mar. 3, 2021, the disclosure of which is hereby incorporated herein by reference in full.

FIELD OF THE INVENTION

The present invention relates generally to materials handling, and more particularly to pharmaceutical prescription handling.

BACKGROUND OF THE INVENTION

In mail order, central fill and large retail pharmacies, as well as at nutraceutical or nutritional supplement packaging facilities, prescription drugs, nutraceuticals and nutritional supplements are dispensed in a high volume. For such services, it is known to use an automatic pill dispensing system to carry out the dispensing of the prescription drugs automatically at a rapid rate.

Some systems have the ability to dispense medications so that medications taken by the patient at the same time are packaged together. Such collections of medications may be packaged in plastic pouches, with each pouch representing an administration time for the patient (e.g., with breakfast, lunch or dinner, at bedtime, etc.). One automated system for dispensing pharmaceuticals into pouches is available from Parata Systems, LLC (Durham, North Carolina) under the trade name ATP® 2. Such a machine, shown in FIGS. 1 and 2 and designated broadly at 10, employs a series of drawers 12 that are slidably mounted in a framework 14 (shown in FIG. 12). Each drawer 12 houses a plurality of canisters 16 (typically sixteen canisters 16 reside in each drawer 12), each of which is filled with pills for dispensing (see FIGS. 3-5). Each canister includes a singulating device 20 that includes a rotating "crown" 22 or other rotary member that conveys individual pills through holes 27 on the canister 16 into an open chute 24 located in the center of the drawer 12. The chute 24 from each drawer 12 (which is defined by full-height walls 26 that separate the canisters 16 of a drawer 12 into two rows—see FIG. 6) leads to a central collection area, with the chutes 24 of drawers in the same column being aligned to form a travel path for the pills. All of the pills for a particular administration time are collected and dropped into a pouch. Typically the pouch is one of a series of pouches connected as a strip, with the pouches presented in the order in which they are to be administered.

Other machines of this variety and canisters used therewith are discussed in U.S. Pat. Nos. 7,258,248; 6,898,919; 7,228,988; and 7,637,078, all of which are hereby incorporated herein by reference in full.

Naturally, the pharmacies filling these orders wish to fill them as efficiently as possible, with little down time. One time-consuming task that can reduce efficiency is the replenishment of canisters. Thus, it may be desirable to provide an approach that reduces down time due to replenishment.

SUMMARY

As a first aspect, embodiments of the invention are directed to a canister for an automated pharmacy packaging machine. The canister comprises: a base; a rotary member positioned in the base; a sleeve mounted to the base having a cavity; a diverter mounted to the sleeve and extending into the cavity, the diverter having a leading edge; and a cover mounted to the sleeve. The diverter is oriented at an oblique angle relative to a longitudinal axis of the sleeve.

As a second aspect, embodiments of the invention are directed to a kit for expanding the capacity of a canister for an automated pharmaceutical packaging machine, the kit comprising: a hollow sleeve having a plurality of side walls, wherein a slot is present in at least one of the side walls; and a plurality of diverters, each of the diverters being configured to mount to the sleeve via the slot such that a leading edge of the diverter is located within the sleeve.

As a third aspect, embodiments of the invention are directed to an automated pharmaceutical packaging machine comprising: a framework; and a plurality of drawers mounted onto the framework via drawer slides, the drawers arranged in an array of rows and columns. Each of the drawers includes a plurality of canisters configured to dispense pharmaceuticals into a chute within the drawer. Drawers positioned in the same column have aligned chutes that form a path to a collection area for packaging. At least some of the drawers have a first height, and some of the other drawers have a second height that is substantially two times the first height.

BRIEF DESCRIPTION OF THE FIGURES

FIG. 1$ is a perspective view of a drop-in universal deflector tube with optional diverter shelves and the deflector of FIG. 17.

DETAILED DESCRIPTION

Figure 1:
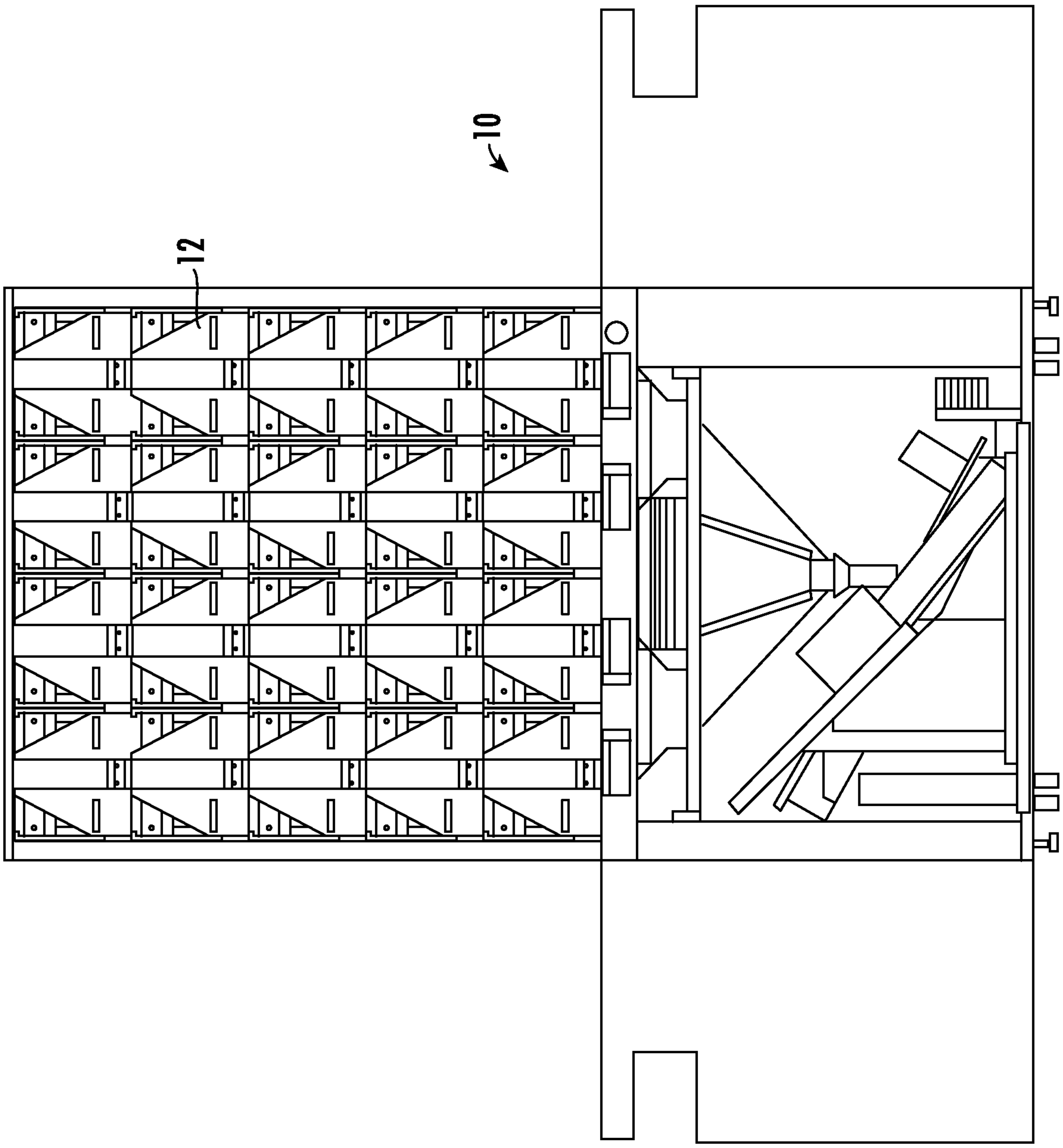
FIG. 1 is a front view of an automated pharmacy packaging machine according to embodiments of the invention.
Figure 2:
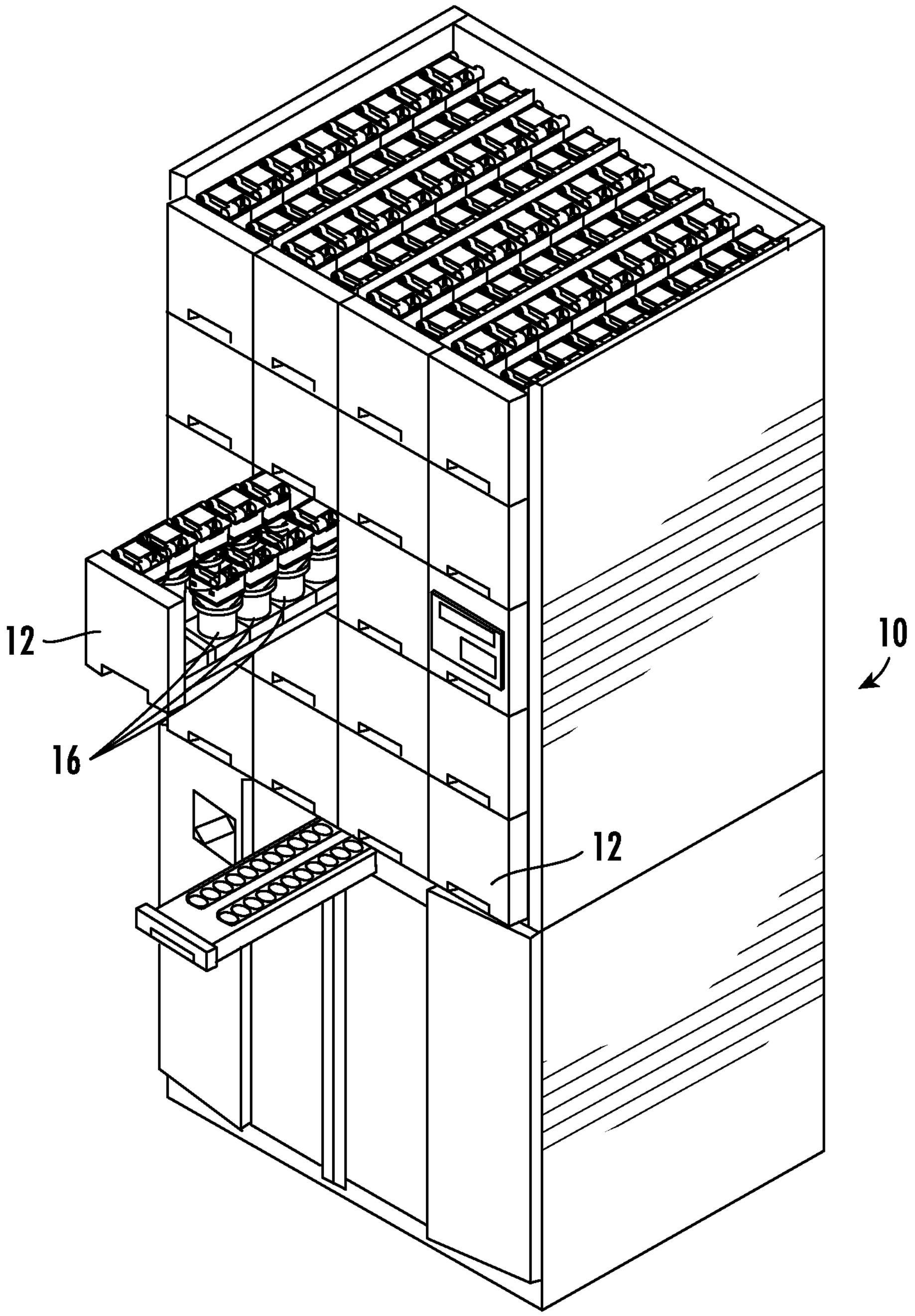
FIG. 2 is a front perspective view of a drawer of the machine of FIG. 1 in an open position showing canisters that contain pills for automated packaging.
Figure 3:
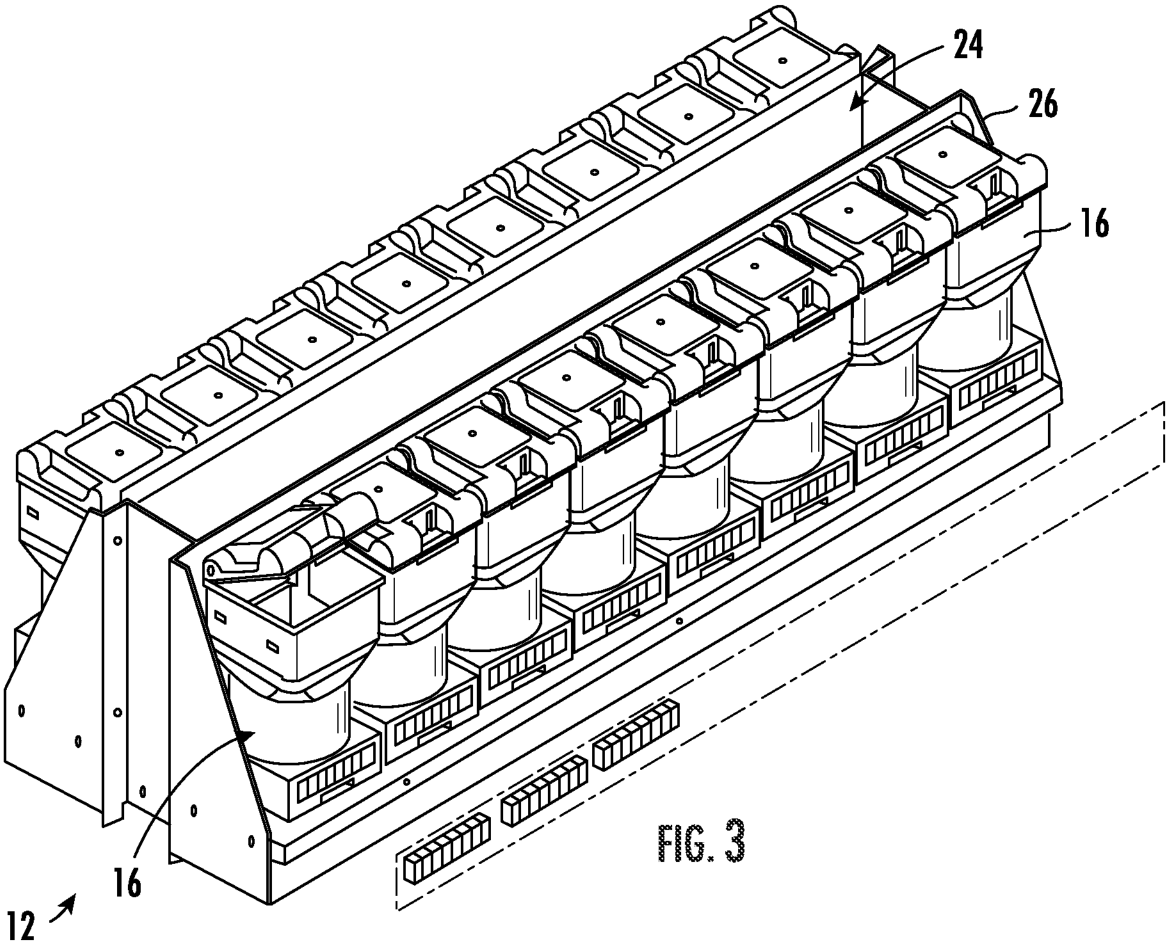
FIG. 3 is a side perspective view of canisters mounted in the drawer of FIG. 2, with one of the canisters dislodged.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Like numbers refer to like elements throughout. In the figures, certain layers, components or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "on," "attached to," "connected to," "coupled with," "contacting," etc., another element, it can be directly on, attached to connected to, coupled with or contacting the other element or intervening elements may also be present. In contrast, when an element is referred to as being, for example, "directly on," "directly attached to," "directly connected to," "directly coupled with," or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "above", "over", "upper", "lower". "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

One potential solution to reducing the replenishment burden discussed above would be to increase the capacity of the canisters 16 within the drawers 12. Referring again to FIG. 1, it can be seen that the drawers 12 of the machine 10 are arranged in a grid or array of rows and columns. Thus, in this arrangement the canisters 16 that are stored within the drawers 12 are necessarily limited in height to the height of the drawer 12.

One option for addressing this limitation without considerably re-designing the machine 10 would be to include one or more "double drawers" (designated at 190 in FIG. 16), which are oversized drawers that would occupy the space of two single drawers stacked vertically. This arrangement would allow taller canisters to be employed; i.e., the use of a double drawer provides a space that is twice the height of a single drawer to house canisters and the accompanying singulating machinery.

Figure 4:
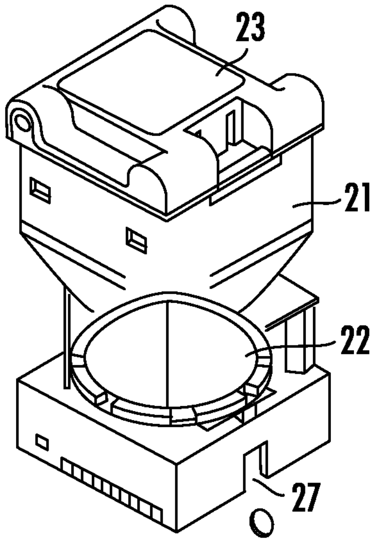
FIG. 4 is a top perspective view of a canister of FIG. 3.
Figure 5:
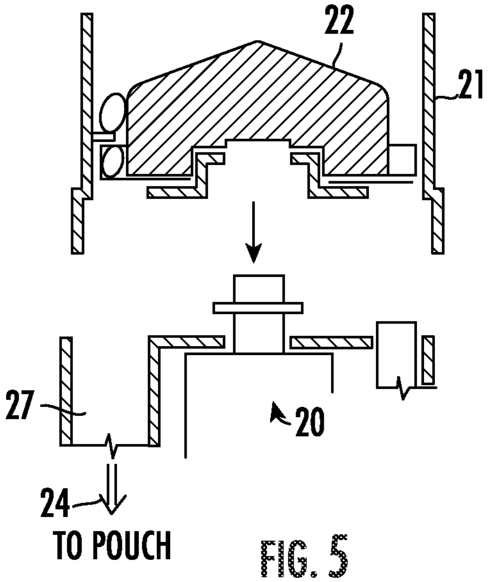
FIG. 5 is a partial side section view of the canister of FIG. 3.
Figure 6:
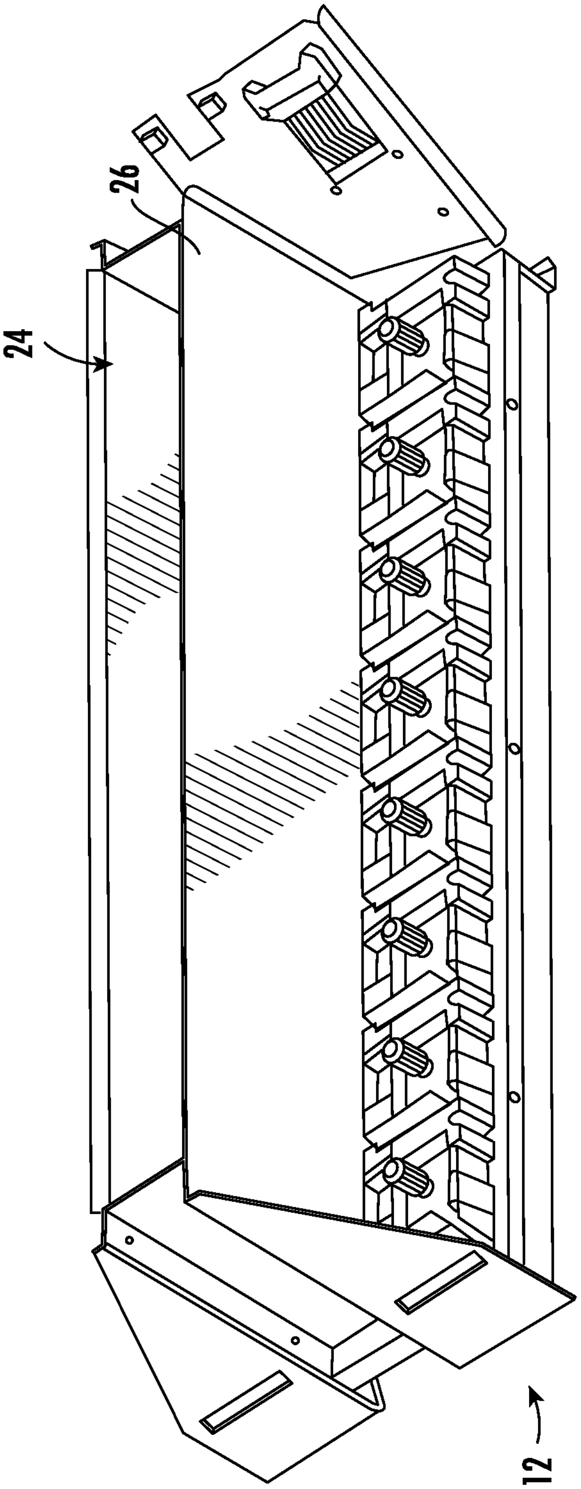
FIG. 6 is a side perspective view of the drawer of FIG. 3 with the canisters removed.

As can be seen in FIGS. 4 and 5, typically a canister 16 includes a base 21 that is located above the rotating crown 22. A cover 23 fits atop the base 21 (typically latched in place); the cover 23 is removed or opened for replenishment of pills, but otherwise remains in place.

Figure 7:
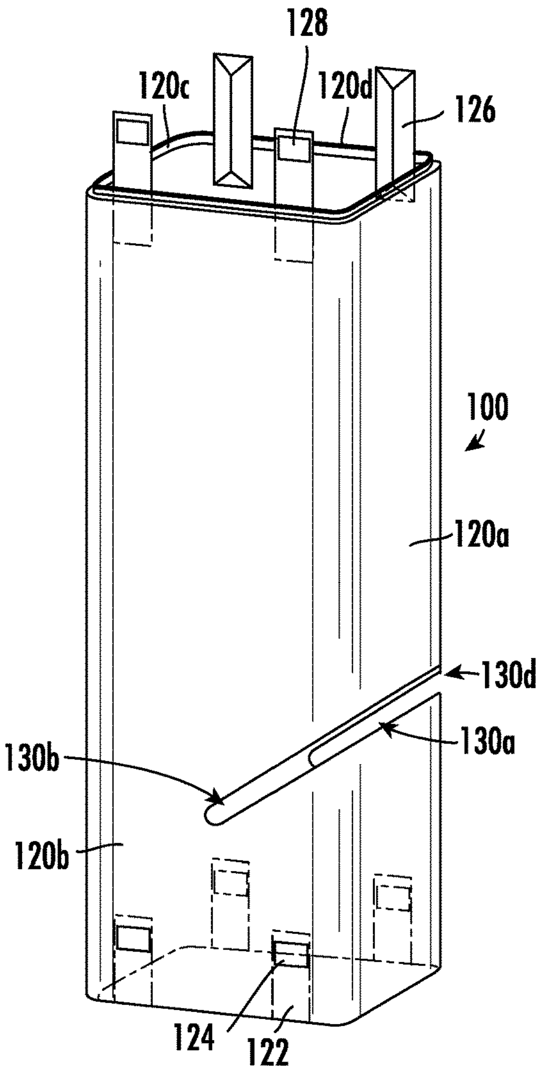
FIG. 7 is a side perspective view of a sleeve that may be used with a canister of FIGS. 3-5 to increase capacity.
Figure 8:
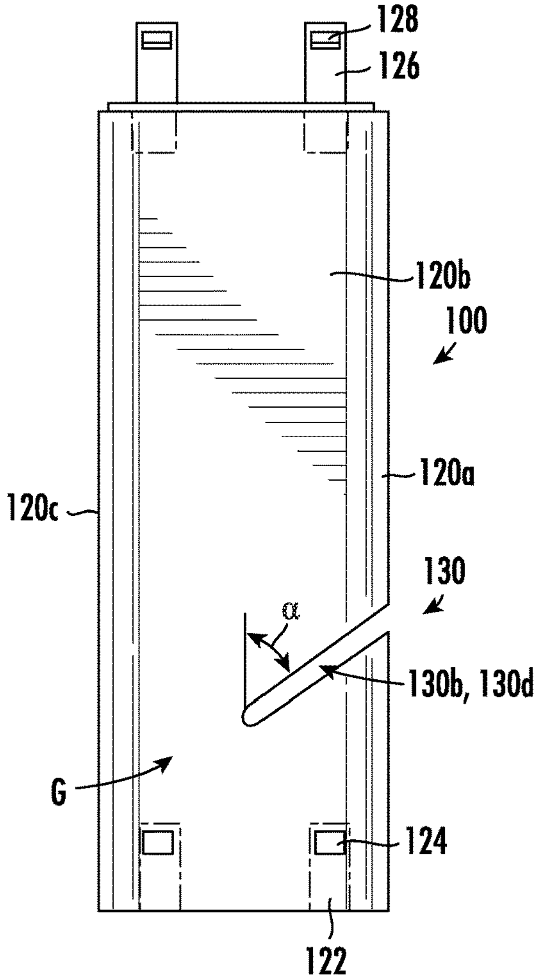
FIG. 8 is a side view of the sleeve of FIG. 7.

Referring now to FIGS. 7 and 8, a sleeve 100 for a canister 116 for a double drawer is shown therein. The sleeve 100 includes four side walls 120*a-d* that define a generally square cross-section that surrounds a cavity. At their lower ends, two of the side walls 120*b*, 120*d* include slots 122 with recesses 124 on their inner surfaces. At their upper ends, the same two side walls 120*b*, 120*d* include latches 126 with outwardly-turned hooks 128 that extend above the upper edges of the side walls 120*a-d*. The latches 126 engage the above-described cover 23, and the slots 122 and recesses 124 receive latches extending from the base 21 that would ordinarily engage the cover 23 in a single drawer arrangement that uses conventional canisters 16.

As can be seen in FIGS. 7 and 8, an open slot 130 is present in the side walls 120*a*, 120*b*, 120*d*. A segment 130*a* of the slot 130 is substantially horizontally disposed in the side wall 120*a*, and segments 130*b*, 130*d* of the slot are routed downwardly therefrom at an oblique angle α relative to the longitudinal axis of the sleeve 100 to end generally in the center of the side walls 120*b*, 120*d*. In some embodiments, the angle α is between about 50 and 65 degrees. In some embodiments, the segment 130*a* of the slot 130 is located in the lower half of the side wall 120*a*, and in further embodiments may be located at a height of between 25 and 50 percent of the total height of the side wall 120*a*. The segments 130*b*, 130*d* of the slot 130 may terminate at a height between about 15 and 40 percent of the total height of their respective side walls 120*b*, 120*d*.

The presence of the slot 130 can enable the insertion of a diverter into the sleeve 100 to facilitate dispensing of pills from the canister 116. It has been determined that, when the canister 116 is fully loaded with certain pills, the weight of the pills (combined with their shape and size) can on occasion impede the rotation of the crown and/or its ability to agitate and convey pills, to the extent that dispensing is negatively impacted. It has further been discovered that the inclusion of a diverter within the sleeve 100 can address these shortcomings and enable the canister 116 to operate smoothly and reliably, even with the increased volume of pills discussed above.

Figure 9A:
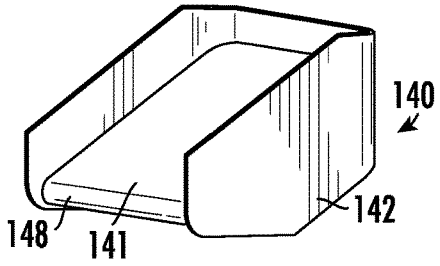
FIG. 9A is a perspective view of a first diverter for use with the sleeve of FIG. 7.
Figure 10A:
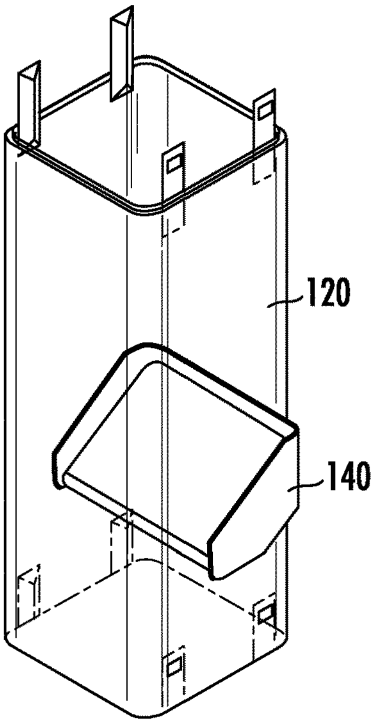
FIG. 10A is a perspective view of the diverter of FIG. 9A mounted in the sleeve of FIG. 7.

FIG. 9A illustrates a diverter 140 that may be employed with the canister 116. The diverter 140 has a flat panel 141 that is surrounded on three sides by a wall 142. The leading edge 148 of the flat panel 141 is straight. As is shown in FIG. 10A, the diverter 140 can be inserted into the slot 130 so that the flat panel 141 forms a downwardly sloping surface within the sleeve 100 that feeds pills to the rotary crown 22 in a more predictable manner. The wall 142 remains outside the sleeve 100 and helps to secure the diverter 140 in place (and closes the slot 130 to prevent external elements/contamination from entering the canister 116). The leading edge 148 is typically positioned between about 1.5 and 2.25 inches from the opposed side wall 120*c* (and in some embodiments is between about 1.75 and 2.0 inches), thereby creating a gap G though which the pills can descend. The leading edge 148 is also typically positioned between about 4 and 6 inches above the bottom surface of the rotating crown 22.

Figure 9B:
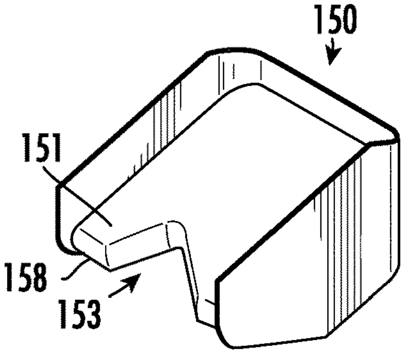
FIG. 9B is a perspective view of a second diverter for use with the sleeve of FIG. 7.
Figure 9C:
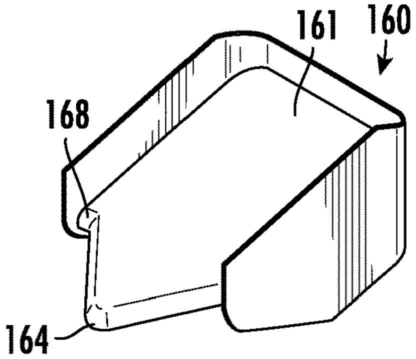
FIG. 9C is a perspective view of a third diverter for use with the sleeve of FIG. 7.
Figure 9D:
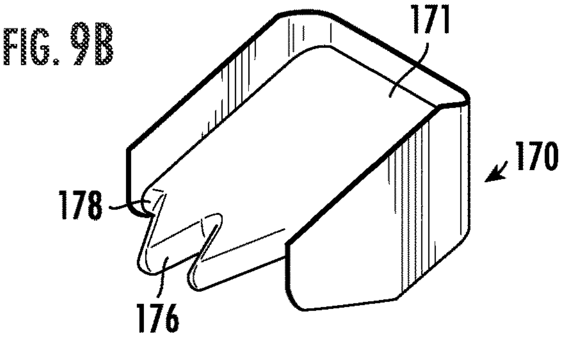
FIG. 9D is a perspective view of a fourth diverter for use with the sleeve of FIG. 7.

While the diverter 140 can enable smooth operation of the canister with certain pills, other pills may benefit from a different diverter due to the size, shape, and or other characteristics of the pills. FIGS. 9B-9D illustrate different diverters 150, 160, 170 that may also be employed with the canister 116. The diverter 150 has a V-shaped notch 153 in the leading edge 158 of its flat panel 151. The diverter 160 has a V-shaped extension 164 in the leading edge 168 of the flat panel 161. The leading edge 178 of the flat panel 171 of the diverter 170 has a W-shaped extension 176. Each of these different diverters 140, 150, 160, 170 provide differently shaped gaps G and may be employed with the canister 116 to facilitate dispensing therefrom for one or more specific types of pills. In each instance, the leading edges 158, 168, 178 are positioned similarly to the leading edge 148 of the diverter 140. The notch 153 may be between about 0.35 and 0.65 inches deep, the extension 164 may be between about 0.75 and 1.25 in length, and the W-shaped extension 176 may be between about 0.35 and 0.65 inches in length.

Figure 10B:
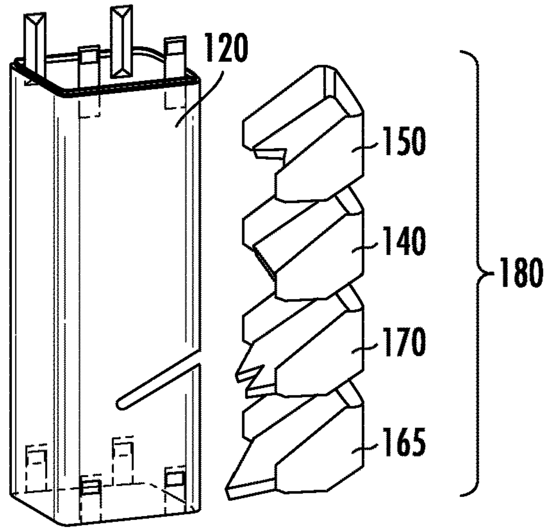
FIG. 10B is a schematic perspective view of the sleeve of FIG. 7 and the diverters of FIGS. 9A-9D that can be packaged as a kit.

It is also contemplated that the sleeve 100 and diverters 140, 150, 160, 170 may be provided to a pharmacy as a kit 180 (see FIG. 10B). This allows the pharmacy to insert and remove any of the diverters 140, 150, 160, 170 from the sleeve 100 as the pharmacy deploys different pills within the canister. In some embodiments, the kit 180 may include two, three or all four of the diverters 140, 150, 160, 170 discussed above.

Figure 10C:
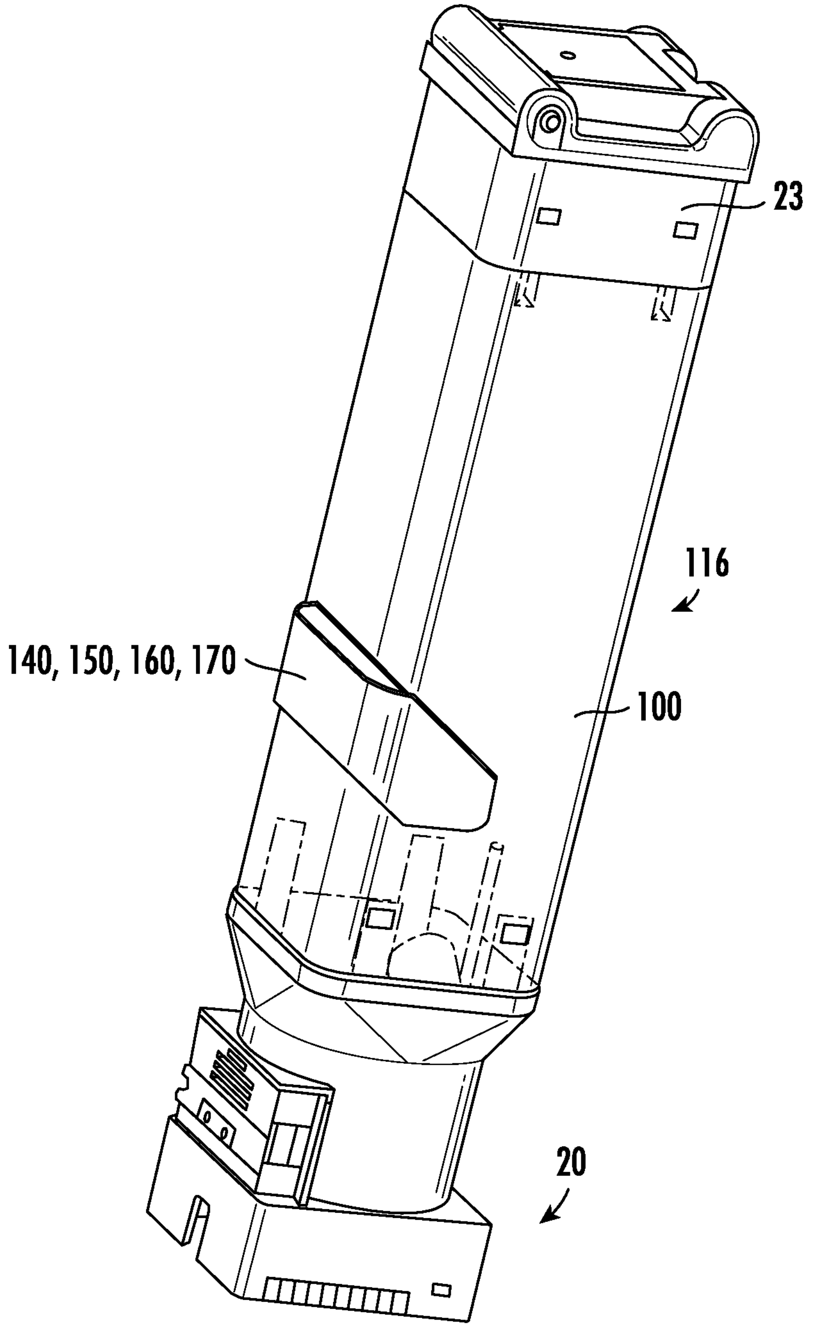
FIG. 10C is a perspective view of a sleeve and diverter as in FIG. 10B mounted on a base to form a canister.

FIG. 10C illustrates a canister 116 with the sleeve 100 mounted between a cap 23 and a singulating device 20. One of the diverters 140, 150, 160, 170 is inserted into the slot of the sleeve 100.

Use of the sleeve 100 between the base 21 and the cover 23 can expand the capacity of the canister 116 dramatically. In one embodiment, inclusion of the sleeve 100 provides the canister with 915 cc of volume, compared to 330 cc for the canister 16 that lacks a sleeve 100. Thus, the sleeve 100 can increase capacity almost three-fold. Of course, the increased capacity has a direct positive impact on reducing replenishment events, which in turn reduces machine down-time.

Typically, the sleeve 100 and diverters 140, 150, 160, 170 are formed of a polymeric material, such as acrylonitrile-butadiene-styrene (ABS). In some embodiments, a food grade polymer is employed.

Another aspect of the use of a "double drawer" 190 in the machine 10 is the additional weight of the canisters 116 that must be supported by the drawer. For example, sixteen fully-loaded canisters 16 in a conventional drawer 12 may weigh between about 16 and 48 pounds. However, sixteen fully loaded canisters 116 in a double drawer may weigh between about 65 and 85 pounds, or even more. As such, modification of the hardware supporting the double drawers may be required or desirable.

Figure 11:
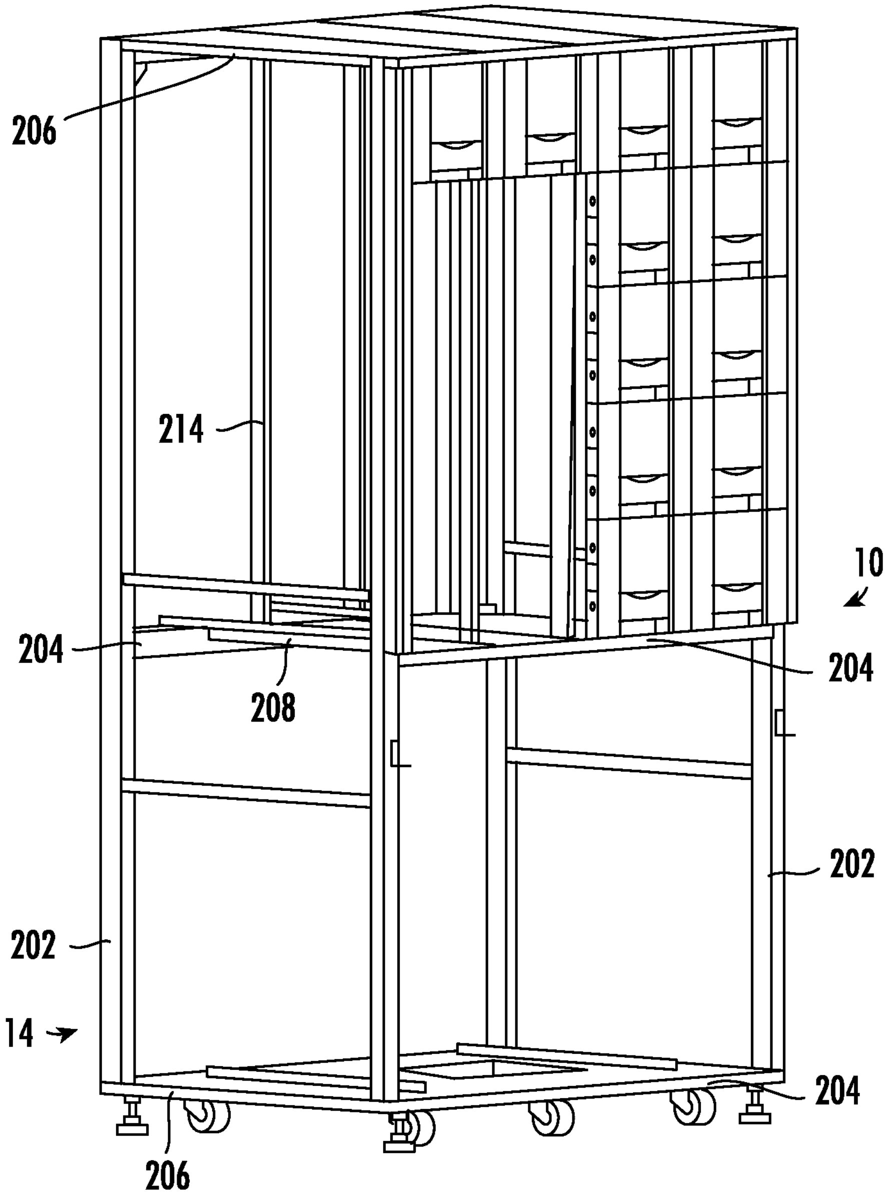
FIG. 11 is a front perspective view of a framework for the machine of FIG. 1, with some drawer fronts shown.
Figure 12:
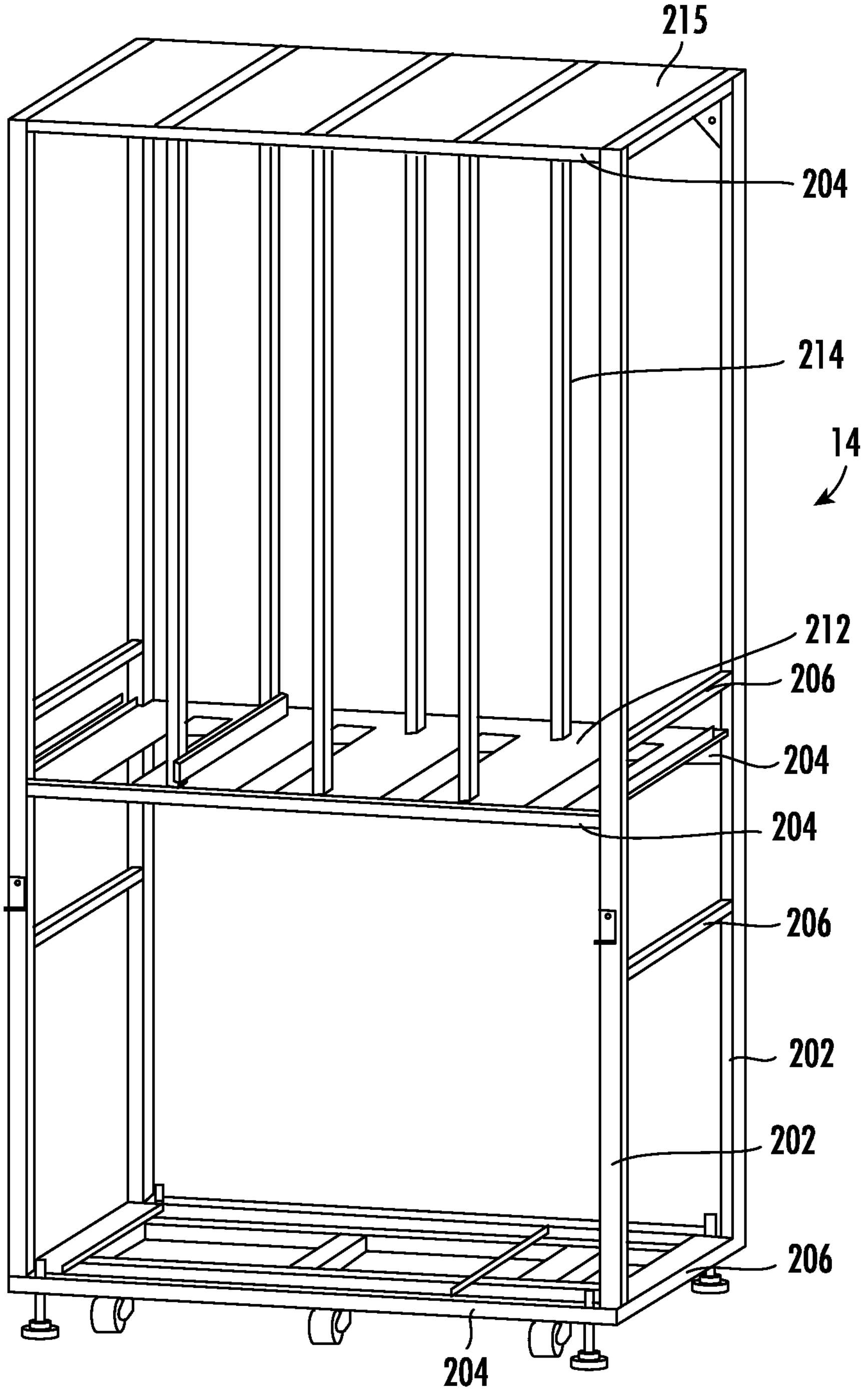
FIG. 12 is a front perspective view of the framework of FIG. 11 with all drawers removed.

Referring now to FIGS. 11 and 12, the machine 10 is shown with several drawers removed to illustrate the skeletal framework 14 that supports the drawers 12, 190. Four uprights 202 define the four corners of the framework 14. Horizontal rails 204 extend across the width of the machine to connect the uprights 202 at three different heights (at the bottom, at the top, and just below the bank of drawers). Horizontal rails 206 extend across the depth of the machine to connect the uprights at four locations (at the bottom, at the top, well below the bank of drawers, and slightly above the bank of drawers). Horizontal supports 208 extend between the horizontal rails 204 located below the drawer bank, and further horizontal supports (not visible in the figures) extend between the horizontal rails 204 located at the top of the machine 10. A sheet metal panel 212 with numerous openings connects to and overlies the supports 208. Another sheet metal panel 215 overlies the uppermost horizontal rails 204, 206. Additional uprights 214 extend between the supports 208 and the uppermost horizontal supports at positions that are between columns of drawers 12, 190.

Figure 13:
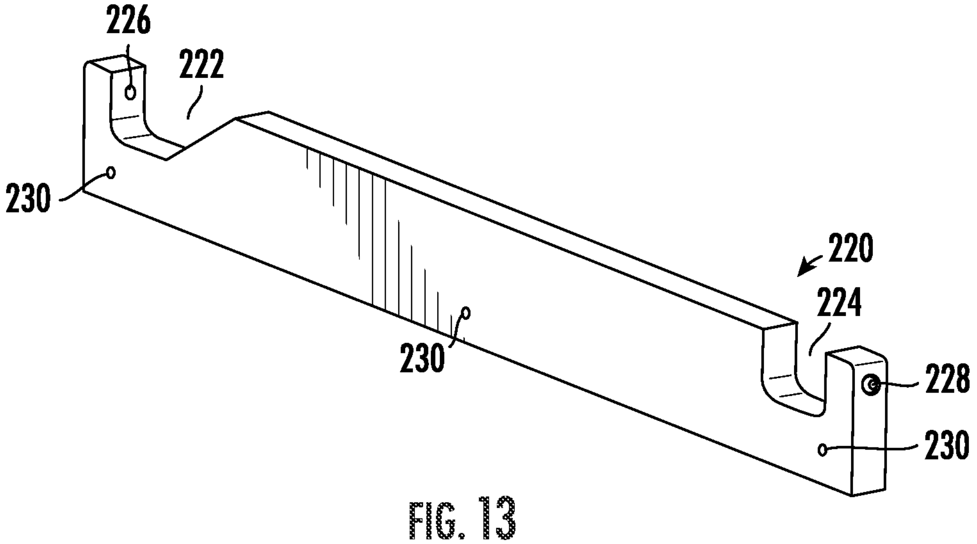
FIG. 13 is a brace that can be used to mount a double drawer according to embodiments of the invention onto the framework of FIG. 11.
Figure 14:
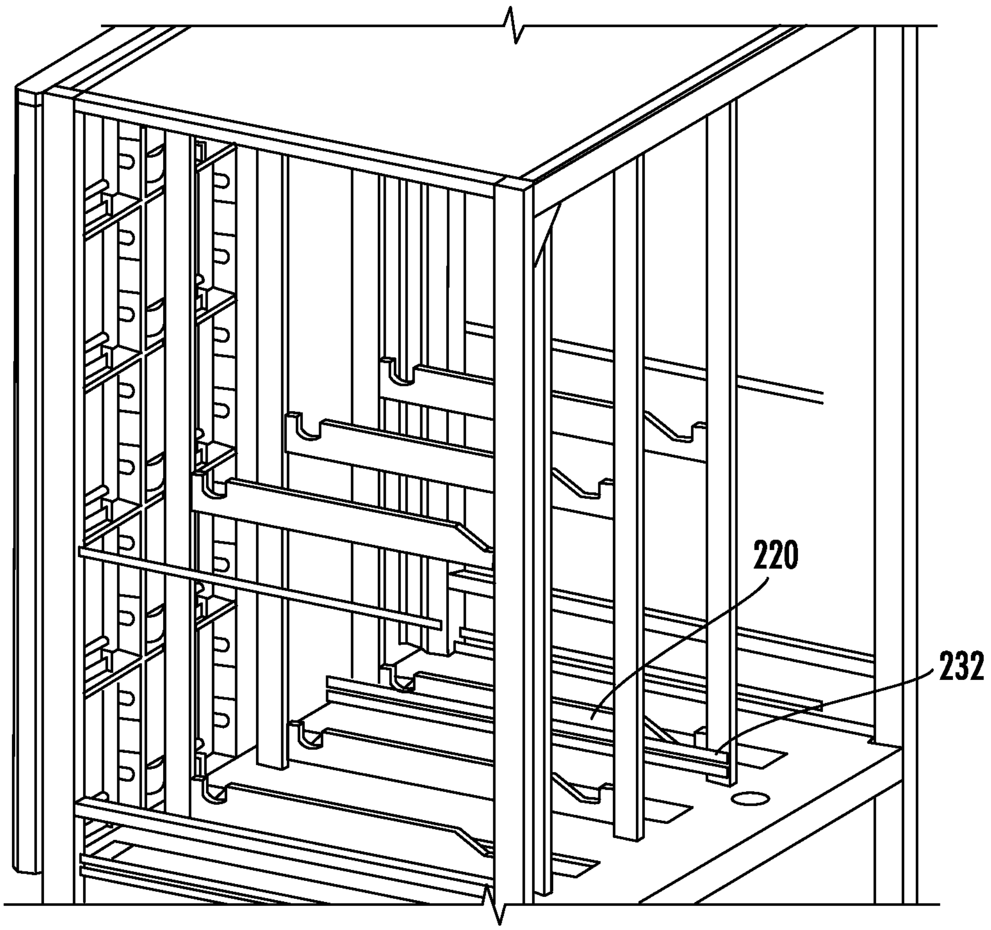
FIG. 14 is a rear partial perspective view showing braces of FIG. 13 mounted onto the framework of FIG. 11.

In prior machines, drawer slides for single drawers were mounted to the uprights 214, which were adequate to support the typical weight of a single drawer. However, with the increased weight of the double drawers, in some instances the uprights 214 may not be sufficient to support the additional weight. FIG. 13 illustrates a brace 220 that may be added between uprights 214 to provide additional structural integrity at locations where a drawer slide is mounted. The brace 220 is generally an elongate rectangle, with a trapezoidal rear cutout area 222 near the rear end and a rectangular front cutout area 224 near the front end. A mounting hole 226 is located on the front surface of the rear cutout area 222 to enable the brace 220 to be fastened to the upright 214 directly in hack of the brace 220, and a mounting hole 228 is located on the front surface of the front cutout area 224 to be fastened to the upright 214 directly in front of the brace 220. Mounting holes 230 are also located at three positions on each side surface of the brace to provide mounting locations for drawer slides on each side of the brace 220 (one drawer slide 232 is shown mounted on a brace in FIG. 14).

Notably, the brace 220 has a thickness that is essentially the same as the thickness of the uprights 214. As such, the brace 220 provides mounting locations for drawer slides at "width" locations in the machine that are similar to those for single drawers. As a result, both single and double drawers may be employed in the same machine, and even in the same column of drawers in the drawer bank, while relying on the same basic design and footprint of prior machines. The braces 220 may also be used to retrofit an existing machine with one or more double drawers.

Figure 15:
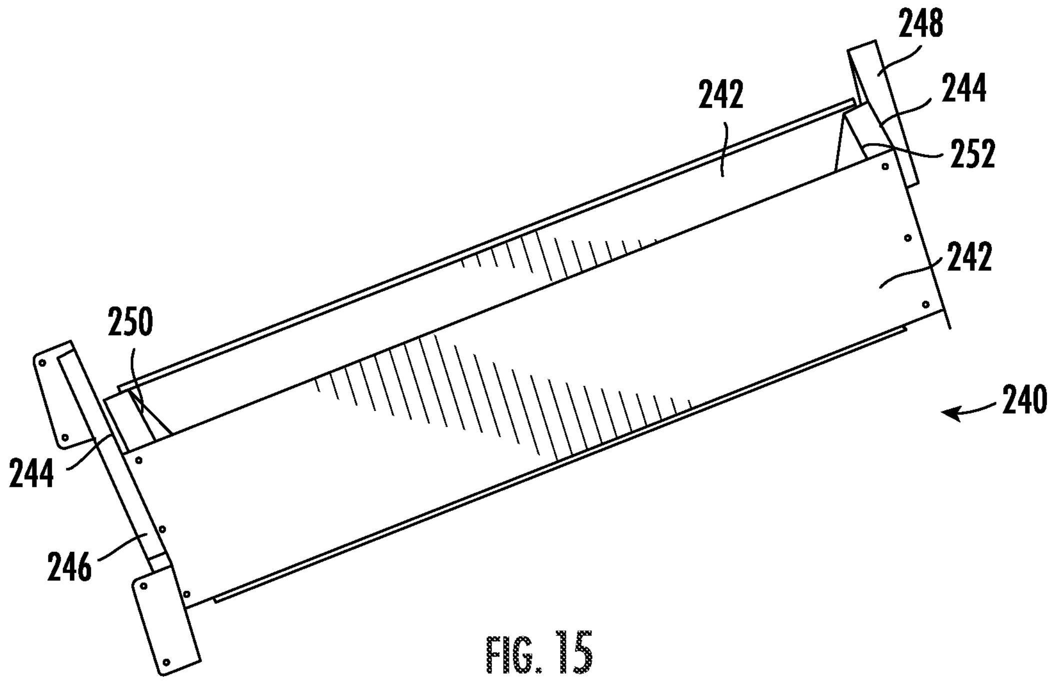
FIG. 15 is a top perspective view of a chute extender for use with the framework of FIG. 11 according to embodiments of the invention.
Figure 16:
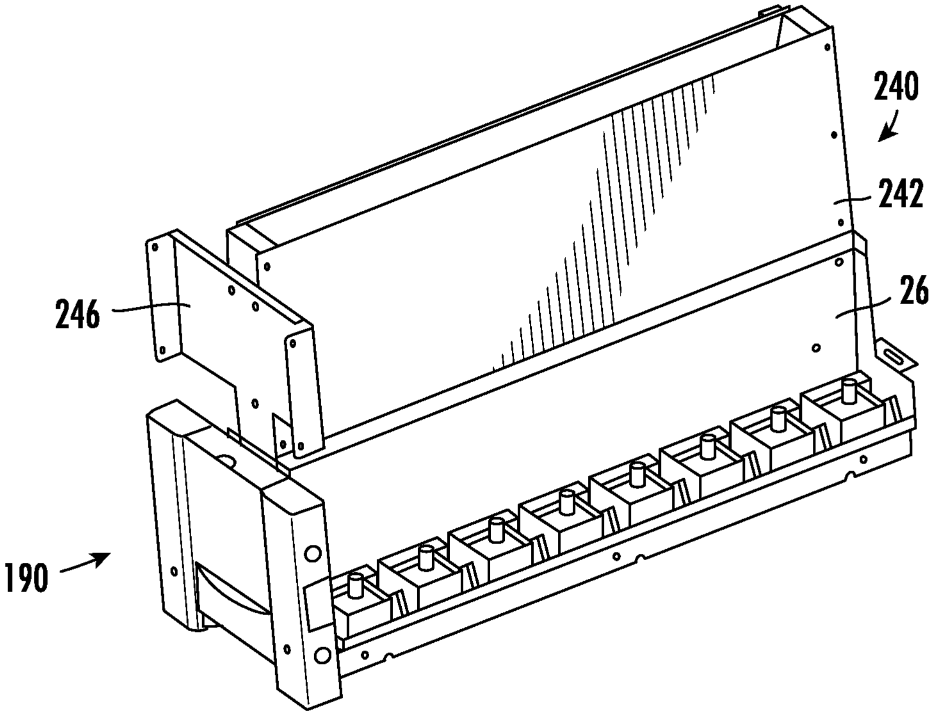
FIG. 16 is a top perspective view of the chute extender of FIG. 15 mounted on a drawer of FIG. 3.

Also, given that a double drawer is twice as tall as a single drawer, accommodation may be required to prevent pills dropping through the chute 24 from an upper drawer from being diverted out of the chute 24 as they pass a lower double drawer 190. Referring to FIG. 15, a chute extender 240 is shown therein. The chute extender 240 includes side walls 242, end walls 244, a front bracket 246 and a rear bracket 248. As seen in FIG. 16, the chute extender 240 is mounted onto the drawer via the front and rear brackets 246, 248 so that the side walls 242 are coplanar with the inner surfaces of the walls 26 that define the chute 24. As such, the side walls 242 fill in some or all of the space between the chute 24 of the bottom half of the lower double drawer 190 and another drawer immediately above the double drawer 190, thereby completing the travel path for pills and preventing pills dropping from an upper drawer from veering out of the downward path and into the lower double drawer 190. Like the brace 220 described above, the chute extender 240 may be employed to add double-drawer capability to the existing design of the machine, and/or can be used to retrofit an existing machine to include one or more double drawers.

The chute extender 240 also includes optional angled front and rear deflectors 250, 252 between the side walls 242 at the front and rear of the chute extender 240 to mimic similar deflectors located between the walls 26 of the drawer 12. These deflectors 250, 252 encourage pills on a forward or rearward path to deflect toward the center of the chute 24.

Figure 17:
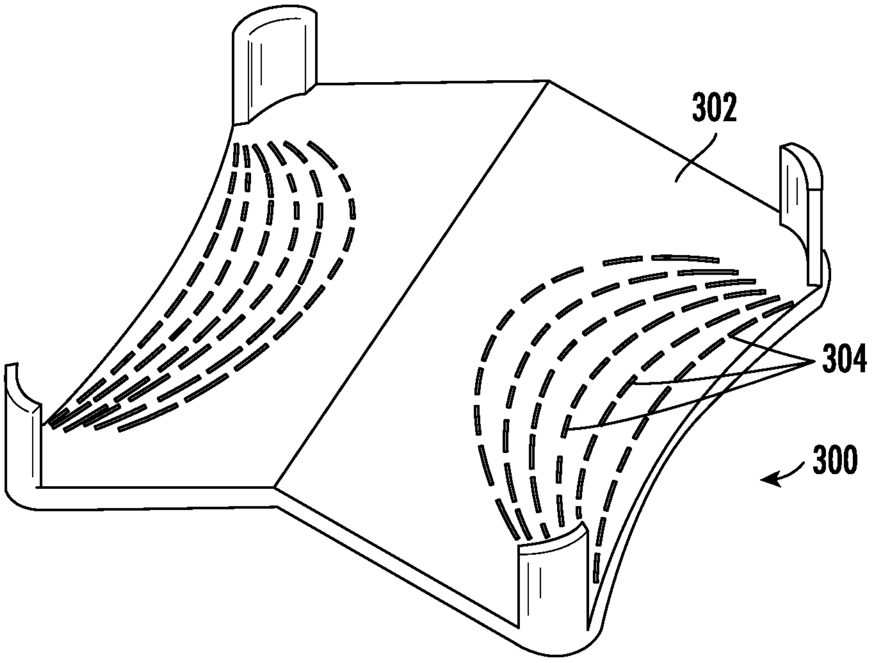
FIG. 17 is a perspective view of a universal deflector according to embodiments of the invention.
Figure 18:
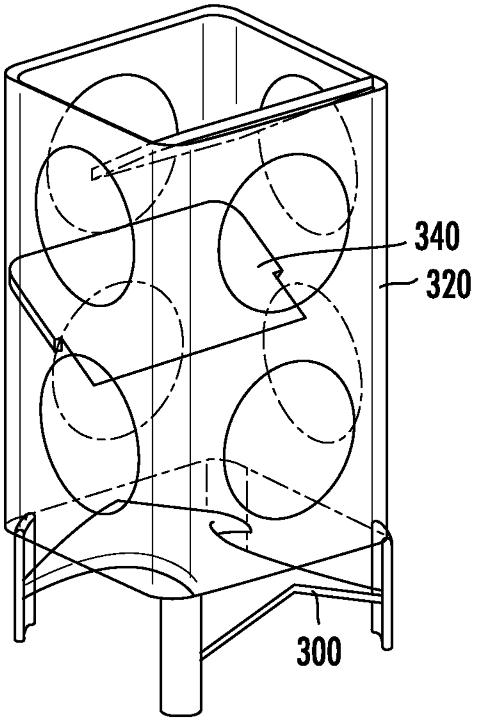

Those of skill in this art will appreciate that the machine and components discussed herein may take different forms. The sleeve 120 may be taller or shorter, may have a different footprint, may have a different cross-section, or the like. The sleeve 120 may also be employed with a different singulating device within the canister. The sleeve 120 may also be employed in some embodiments without any of the diverters 140, 150, 160, 170, or may employ diverters/deflectors of a different form. For example, FIG. 17 illustrates an angled deflector 300 that has a plurality of arcuate lines of slits 304 in its panels 302. A portion of each panel 302 can be broken off along one of the lines of slits 304 to produce a deflector of a desired size/configuration. The deflector 300, once modified in the desired manner (see FIG. 18), can then be employed in a drop-in universal deflector sleeve 320 along with an optional standard diverter 340.

In addition, the machine 10 may omit the brace 220, or the brace 220 may take a different form or be attached to the framework in a different manner. Similarly, the chute extender 240 may be omitted in some embodiments, and/or the walls 24 of the drawer 12 may be manufactured in a taller form.

Further, although the concepts discussed herein are directed to the pouch packaging machine 10, those of skill in this art will appreciate that other types of pharmaceutical packaging machines, such as blister pack packaging machines, may also benefit from such concepts.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A canister for an automated pharmacy packaging machine, comprising:
- a base;
- a rotary member positioned in the base;
- a sleeve mounted to the base having a cavity;
- a diverter mounted to the sleeve and extending into the cavity, the diverter having a leading edge;
- a cover mounted to the sleeve;
- wherein the diverter is oriented at an oblique angle relative to a longitudinal axis of the sleeve.

2. The canister defined in claim 1, wherein the sleeve includes a side wall having a slot therein, and wherein the diverter is mounted in the slot.

3. The canister defined in claim 1, wherein the leading edge has a profile selected from the group consisting of: straight; V-shaped extension; V-shaped notch; and W-shaped extension.

4. The canister defined in claim 1, wherein the sleeve further comprises a plurality of latches, and the cover comprises recesses that receive the latches.

5. The canister defined in claim 1, wherein the oblique angle is between about 50 and 65 degrees.

6. The canister defined in claim 1, wherein the leading edge is located at a height of between about 15 and 40 percent of an overall height of the sleeve.

7. The canister defined in claim 1, wherein the leading edge defines a gap with a side wall of the sleeve, and wherein the gap is between about 1.5 and 2.25 inches.

8. The canister defined in claim 1, wherein the sleeve is formed of a polymeric material.

9. A kit for expanding the capacity of a canister for an automated pharmaceutical packaging machine, the kit comprising:
- a hollow sleeve having a plurality of side walls, wherein a slot is present in at least one of the side walls;
- a plurality of diverters, each of the diverters being configured to mount to the sleeve via the slot such that a leading edge of the diverter is located within the sleeve.

10. The kit defined in claim 9, wherein the plurality of diverters includes at least two diverters, the two diverters having leading edges with different profiles chosen from the group consisting of: straight; V-shaped extension; V-shaped notch; and W-shaped extension.

11. The kit defined in claim 9, wherein the plurality of diverters includes at least three diverters with leading edges with different profiles chosen from the group consisting of: straight; V-shaped extension; V-shaped notch; W-shaped extension.

12. The kit defined in claim 9, wherein the plurality of diverters includes at least four diverters with leading edges with different profiles chosen from the group consisting of: straight; V-shaped extension; V-shaped notch; W-shaped extension.

13. The kit defined in claim 9, wherein the slot is disposed at an oblique angle to a longitudinal axis of the sleeve.

14. An automated pharmaceutical packaging machine, comprising:
- a framework;
- a plurality of drawers mounted onto the framework via drawer slides, the drawers arranged in an array of rows and columns;
- each of the drawers including a plurality of canisters configured to dispense pharmaceuticals into a chute within the drawer;
- wherein drawers positioned in the same column have aligned chutes that form a path to a collection area for packaging;

wherein at least some of the drawers have a first height, and some of the other drawers have a second height that is substantially two times the first height.

15. The automated pharmaceutical packaging machine defined in claim 14, wherein the drawer slides associated with the drawers of the second height are mounted to a brace that is mounted to the framework, and the drawer slides associated with the drawers of the first height are mounted directly to the framework.

16. The automated pharmaceutical packaging machine defined in claim 14, wherein a first drawer of the second height includes a chute expander mounted thereon, the chute expander configured to extend between the chute of the first drawer and another drawer positioned above the first drawer to at least partially complete the path to the collection area.

17. The automated pharmaceutical packaging machine defined in claim 14, wherein canisters in the drawers of the second height have a greater volumetric capacity than canisters in the drawers of the first height.

* * * * *